US009008080B1

(12) United States Patent
Mehta et al.

(10) Patent No.: US 9,008,080 B1
(45) Date of Patent: Apr. 14, 2015

(54) SYSTEMS AND METHODS FOR CONTROLLING SWITCHES TO MONITOR NETWORK TRAFFIC

(71) Applicant: Big Switch Networks, Inc., Mountain View, CA (US)

(72) Inventors: Munish Mehta, Fremont, CA (US); Ranganath Rao, Fremont, CA (US); Edward R. Swierk, Mountain View, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 199 days.

(21) Appl. No.: 13/776,419

(22) Filed: Feb. 25, 2013

(51) Int. Cl.
*H04L 12/28* (2006.01)
*H04L 12/931* (2013.01)

(52) U.S. Cl.
CPC ...................................... *H04L 49/60* (2013.01)

(58) Field of Classification Search
USPC ......... 370/312, 327, 340, 349, 357, 359, 385, 370/386, 389, 390, 395.31, 400, 401, 419, 370/422
See application file for complete search history.

(56) References Cited

U.S. PATENT DOCUMENTS

| | | | |
|---|---|---|---|
| 7,577,098 B2 | 8/2009 | Tamura et al. | |
| 8,321,555 B2 | 11/2012 | Gunther | |
| 8,321,938 B2 | 11/2012 | Strayer et al. | |
| 2008/0189769 A1* | 8/2008 | Casado et al. | 726/4 |
| 2011/0258702 A1* | 10/2011 | Olney et al. | 726/24 |
| 2011/0286324 A1* | 11/2011 | Bellagamba et al. | 370/219 |
| 2012/0177370 A1* | 7/2012 | Berman | 398/58 |
| 2012/0281698 A1* | 11/2012 | Forster et al. | 370/392 |
| 2013/0010600 A1 | 1/2013 | Jocha et al. | |
| 2013/0070762 A1* | 3/2013 | Adams et al. | 370/389 |
| 2013/0097335 A1* | 4/2013 | Jiang et al. | 709/245 |

OTHER PUBLICATIONS

Pfaff et al., OpenFlow Switch Specification, Dec. 31, 2009, 42 pages.

* cited by examiner

*Primary Examiner* — Benjamin H Elliott, IV
(74) *Attorney, Agent, or Firm* — Treyz Law Group; Chih-Yun Wu; Michael H. Lyons

(57) ABSTRACT

A packet forwarding network may include switches that perform network forwarding operations to forward network traffic between end hosts that are coupled to the packet forwarding network. An analysis network that is controlled by a controller may be coupled to the packet forwarding network. The analysis network and the packet forwarding network may overlap. Switches such as hybrid switches in the overlapping network portions may be controlled by the controller to copy network packets without interfering with the network forwarding operations of the packet forwarding network. The analysis network may include a central portion to which analysis tools are coupled and one or more isolated portions. The controller may control the client switches of the central portion and the isolated portions to establish tunneling paths through the forwarding network.

22 Claims, 15 Drawing Sheets

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ADDITIONAL PACKET INFORMATION (E.G., HEADERS) | ACTION |
|---|---|---|---|---|---|---|---|---|
| * | * | 00:1FAB | * | * | * | * | ⋮ | SEND TO PORT 3 |
| * | * | * | * | 172.12.3.4 | * | * | | SEND TO PORT 4 |
| * | * | * | * | * | * | 80 | | DROP |

FIG. 6B

SYSTEMS AND METHODS FOR CONTROLLING SWITCHES TO MONITOR NETWORK TRAFFIC

BACKGROUND

This relates to communication networks, and more particularly, to communications networks having network switches that are controlled by a controller.

Packet-based networks such as the internet and local data networks that are connected to the internet include network switches. Network switches are used in forwarding packets from packet sources to packet destinations. The packets may be sometimes referred to as frames.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

It is often desirable to monitor network traffic that flows through a network. Conventional network monitoring often utilizes one or more network taps that are interposed between switches of the network. The network tap includes a monitor port that is directly coupled to a monitoring device and copies network traffic that flows between the switches of the network. The copied network traffic is provided to the monitoring device via the monitor port. However, it can be challenging to monitor networks using such arrangements as the networks increase in size and complexity. For example, in order to monitor network traffic at multiple network locations, network taps and corresponding monitoring devices must be provided at each of the network locations, which increases cost and leads to inefficient use of network monitoring resources.

SUMMARY

A packet forwarding network may include switches that perform network forwarding operations to forward network traffic between end hosts that are coupled to the packet forwarding network. An analysis network that is controlled by a controller may be coupled to the packet forwarding network. The analysis network and the packet forwarding network may overlap. Switches in the overlapping network portion may be controlled by the controller to copy network packets without interfering with the network forwarding operations of the packet forwarding network.

The switches in the overlapping portion of the analysis and packet forwarding networks may include hybrid switches that have dedicated packet forwarding circuitry and controller clients. The dedicated packet forwarding circuitry may forward network packets independently from the controller (e.g., the controller may be unable to control the forwarding of network packets through the hybrid switches). The controller may control the controller clients to copy at least a portion of network packets that are forwarded by the dedicated packet forwarding circuitry. The controller may control the analysis network to forward the copied network packets to analysis tools that are coupled to the analysis network.

In some scenarios, the analysis network may include a central portion to which analysis tools are coupled and one or more isolated portions that are separated from the central portion by at least one non-client switch of the forwarding network. To help ensure that copied network packets from the isolated portions are correctly forwarded to analysis devices, the controller may control the client switches of the central portion and the isolated portions to establish tunneling paths through the forwarding network that do not interfere with network forwarding operations of the forwarding network and do not require control of non-client switches in the forwarding network.

Further features of the present invention, its nature and various advantages will be more apparent from the accompanying drawings and the following detailed description.

BRIEF DESCRIPTION OF THE DRAWINGS

FIG. 6B is a diagram of an illustrative flow table of the type that may be used by a packet processing system showing three illustrative types of packet forwarding that may be performed based on the flow table entries of the flow table in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. As examples, the switches may include routers, firewalls, load balancers, or other packet forwarding systems. In this way, data packets that are transmitted by a packet source may be delivered to a packet destination. In network terms, packet sources and destinations are sometimes referred to as end hosts. Examples of end hosts are personal computers, servers, and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
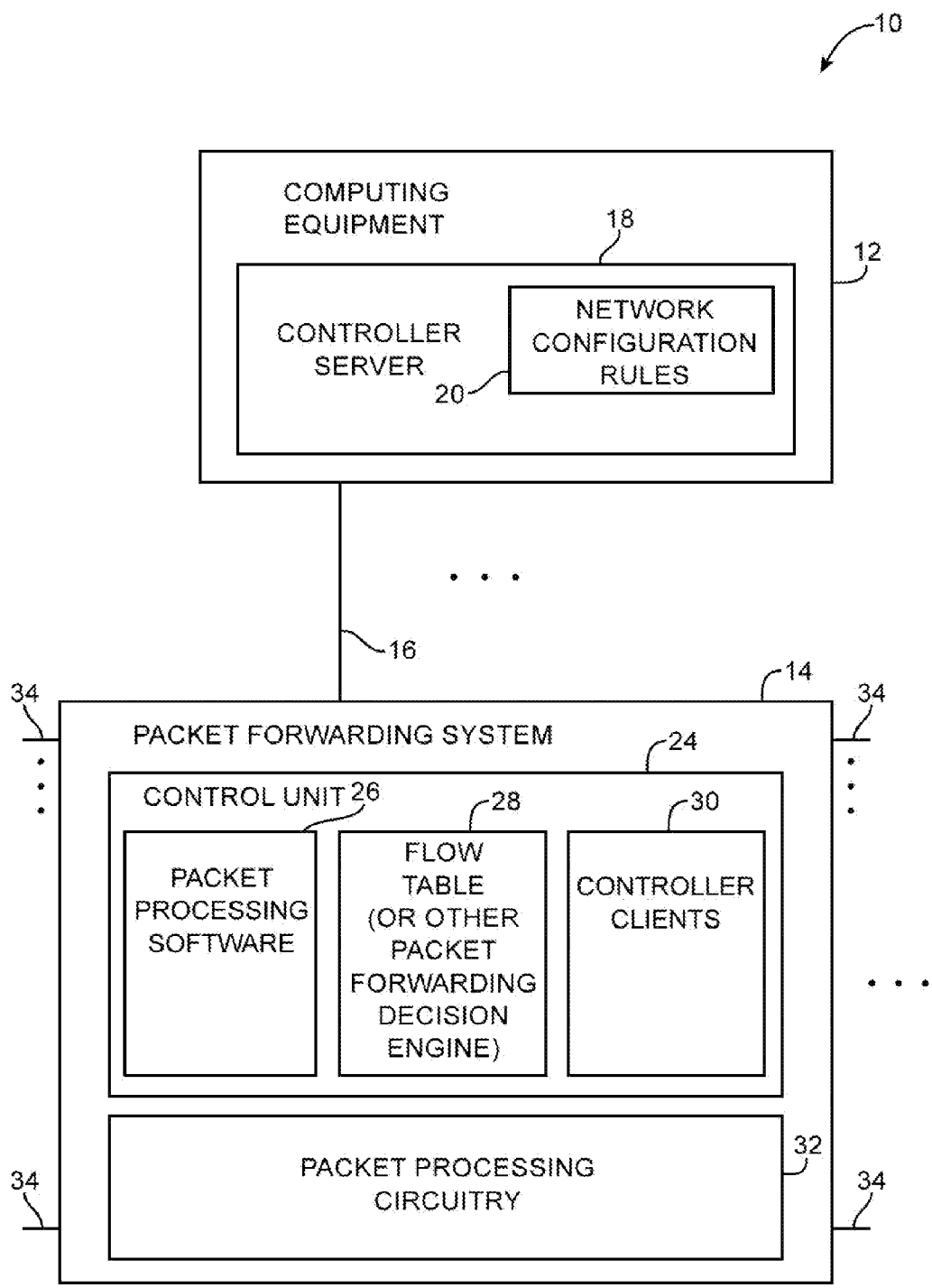
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (e.g., each packet forwarding system) 14 may have input-output ports 34 (sometimes referred to as network switch interfaces). Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18 may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. If desired, any packet forwarding decision engine may be used in place of or in addition to flow tables 28 to assist packet forwarding system 14 to make decisions about how to forward network packets. As an example, packet forwarding decision engines may direct packet forwarding system 14 to forward network packets to predetermined ports based on attributes of the network packets (e.g., based on network protocol headers).

Figure 2:
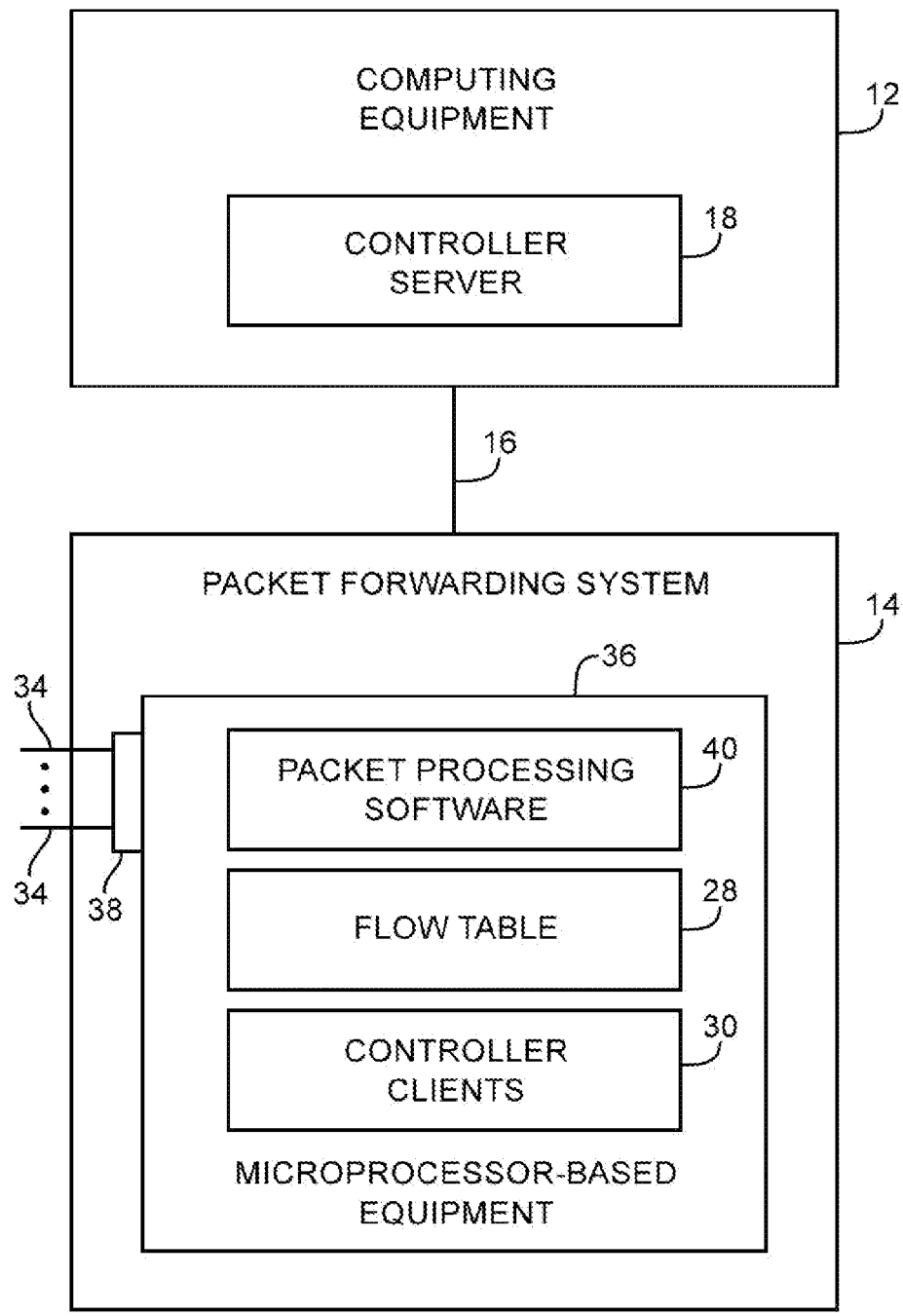
FIG. 2 is a diagram showing how a packet forwarding system may be implemented using microprocessor-based equipment that runs a packet processing engine in accordance with an embodiment of the present invention.

If desired, switch 14 may be implemented using a general purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
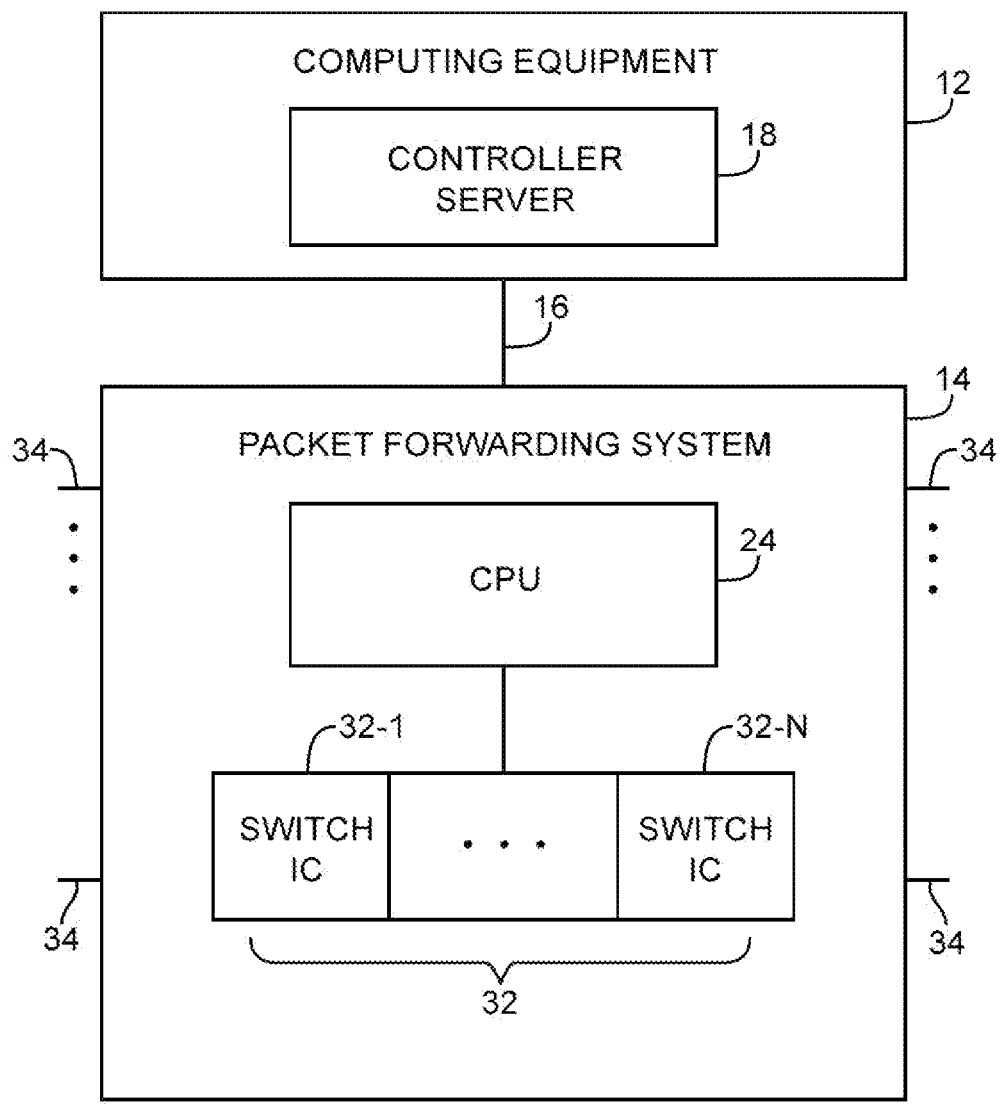
FIG. 3 is a diagram of a packet forwarding system and associated controller in which the packet forwarding system includes a control unit and associated switching integrated circuits in accordance with an embodiment of the present invention.

Network switches such as network switch 14 of FIG. 1 may be implemented using control circuitry that is coupled to one or more high-speed switching integrated circuits ("switch ICs"). This type of configuration is shown in FIG. 3. As shown in FIG. 3, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 4:
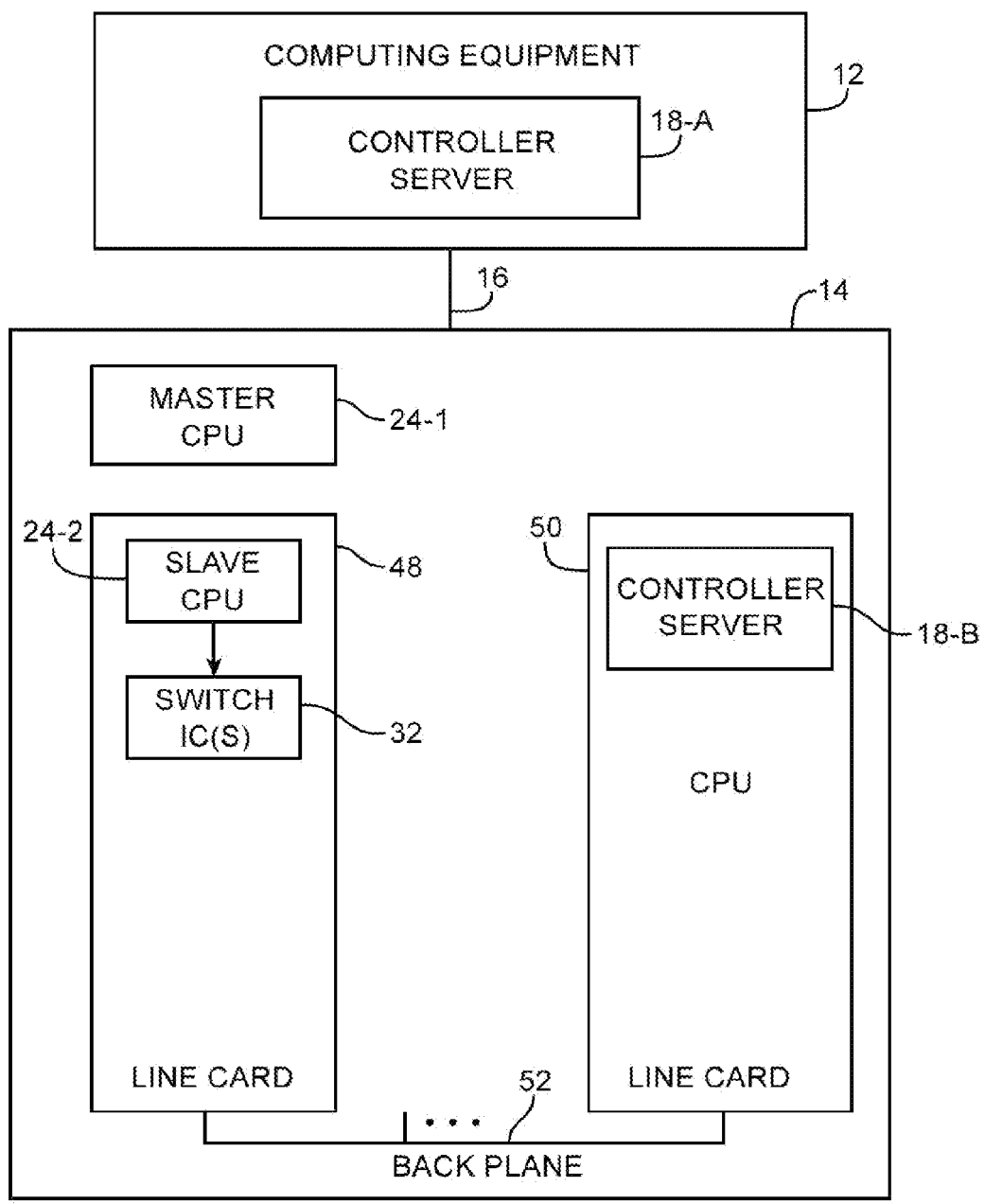
FIG. 4 is a diagram of a network in which a packet forwarding system has master and slave controllers and in which a controller server may be implemented on remote computing equipment or on a line card in the packet forwarding system in accordance with an embodiment of the present invention.

Another illustrative switch architecture that may be used in implementing network switch 14 of FIG. 1 is shown in FIG. 4. In the FIG. 4 example, switch 14 (e.g., or other packet forwarding systems) may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 4, the controller server may be implemented using the processing resources of a line card. For example, the controller server may be implemented on line card 50 as illustrated by controller server 18-B of FIG. 4. If desired, the controller server may be implemented on computing equipment 12 (e.g., as controller server 18-A of FIG. 4). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 5:
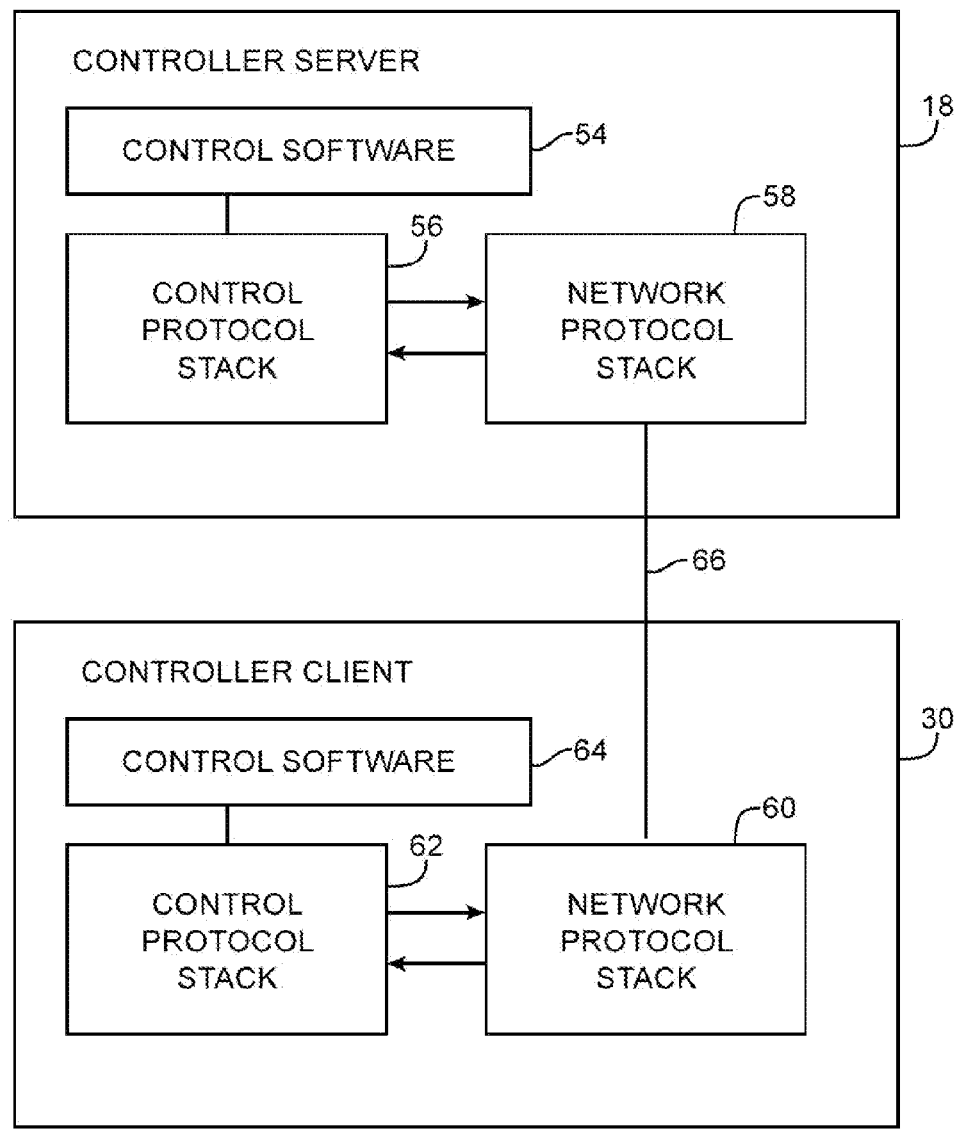
FIG. 5 is a diagram of a controller server and controller client that may communicate over a network connection in accordance with an embodiment of the present invention.

As shown in FIG. 5, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 4. Arrangements in which path 66 is a network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 5, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 6A:
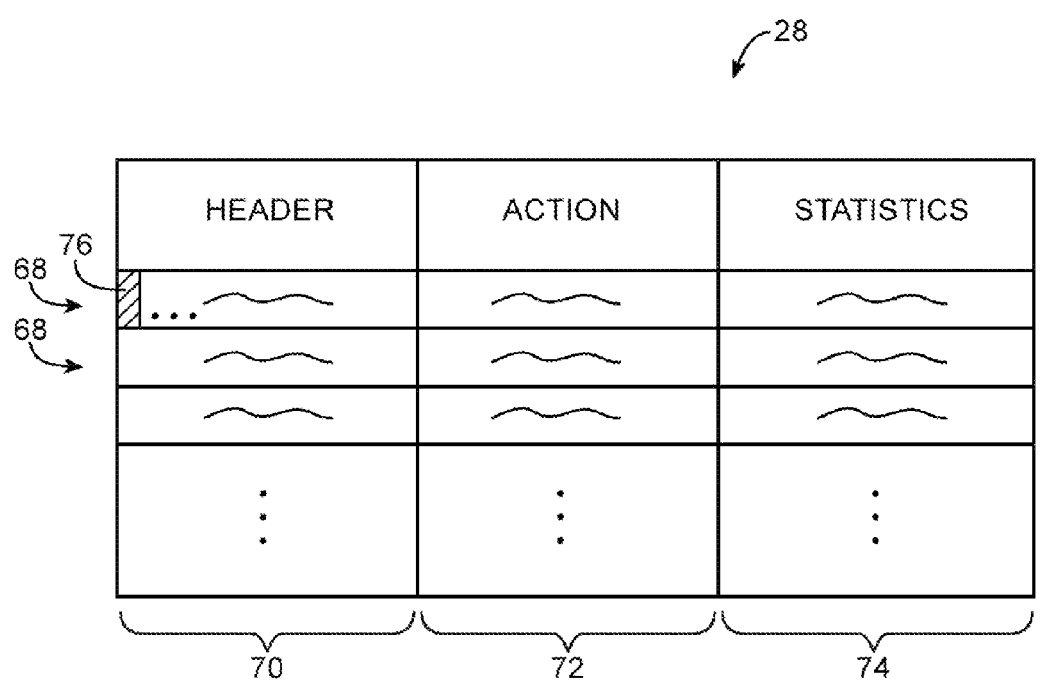
FIG. 6A is a diagram of an illustrative flow table of the type that may be used by a packet processing system in accordance with an embodiment of the present invention.

An illustrative flow table is shown in FIG. 6. As shown in FIG. 6A, table 28 may have flow table entries (rows) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum forwarding tree, not including the incoming interface). Additional actions that may be taken by switch 14 include: an enqueue action to forward a packet through a queue attached to a port, a copy action (e.g., to provide copied network traffic at an identified port), and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port.

FIG. 6B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet. Additional fields may match additional packet information (e.g., packet header information of network packets).

The entry of the first row of the FIG. 6B table directs the switch in which the flow table entry is operating to perform Ethernet switching. In particular, incoming packets with matching Ethernet destination addresses are forwarded to port 3.

The entry of the second row of table of FIG. 6B illustrates how a switch may be configured to perform internet routing (i.e., packets are forwarded based on their destination IP address).

The third row of the table of FIG. 6B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 6B may be loaded into a switch 14 by controller server 18 during system setup operations or may be provided to a switch 14 from controller server 18 in real time in response to receipt and processing of packets at controller server 18 from switches such as switch 14. In a network with numerous switches 14, each switch can be provided with appropriate flow table entries to form a path through the network.

Figure 7:
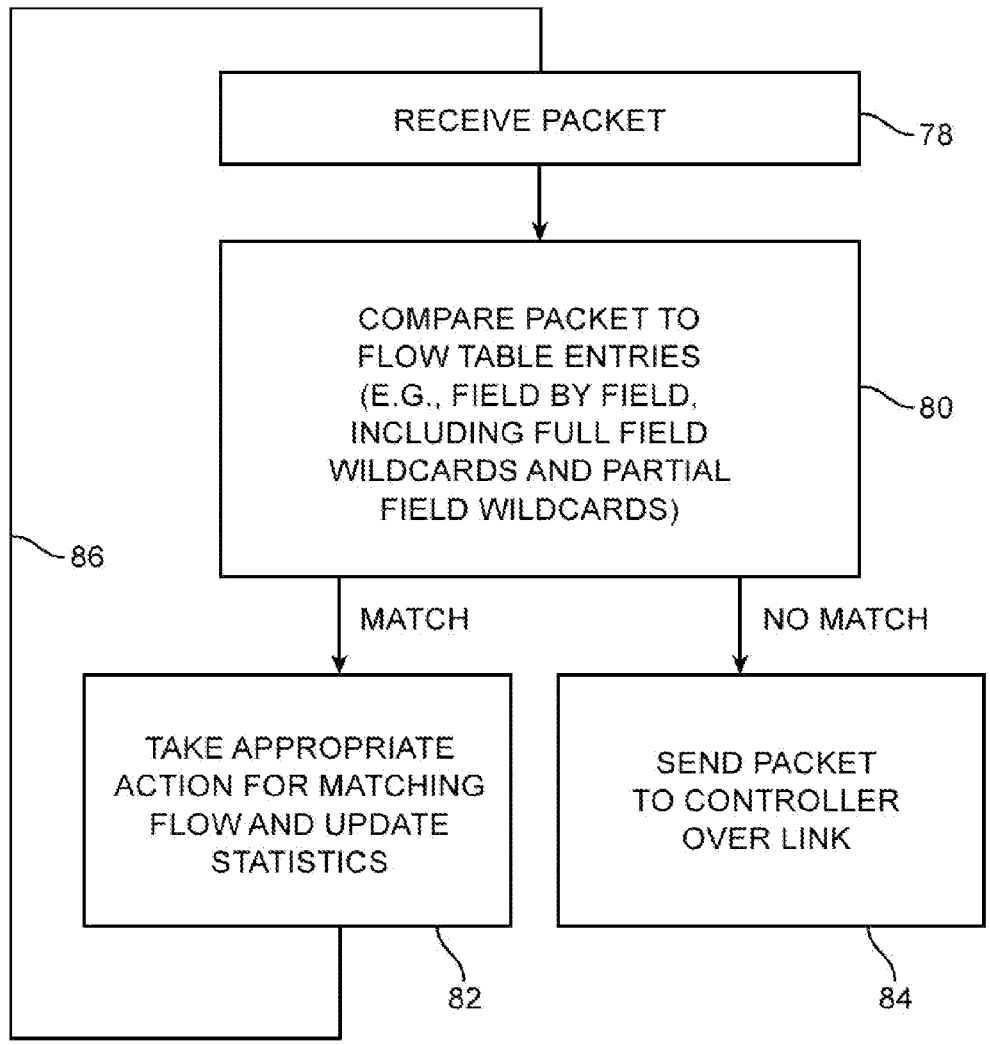
FIG. 7 is a flow chart of illustrative steps involved in processing packets in a packet processing system in accordance with an embodiment of the present invention.

Illustrative steps that may be performed by switch 14 in processing packets that are received on input-output ports 34 are shown in FIG. 7. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (e.g., complete addresses). Other fields may contain wildcards (i.e., fields marked with the "don't care" wildcard character of "*"). Yet other fields may have partially complete entries (e.g., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 8:
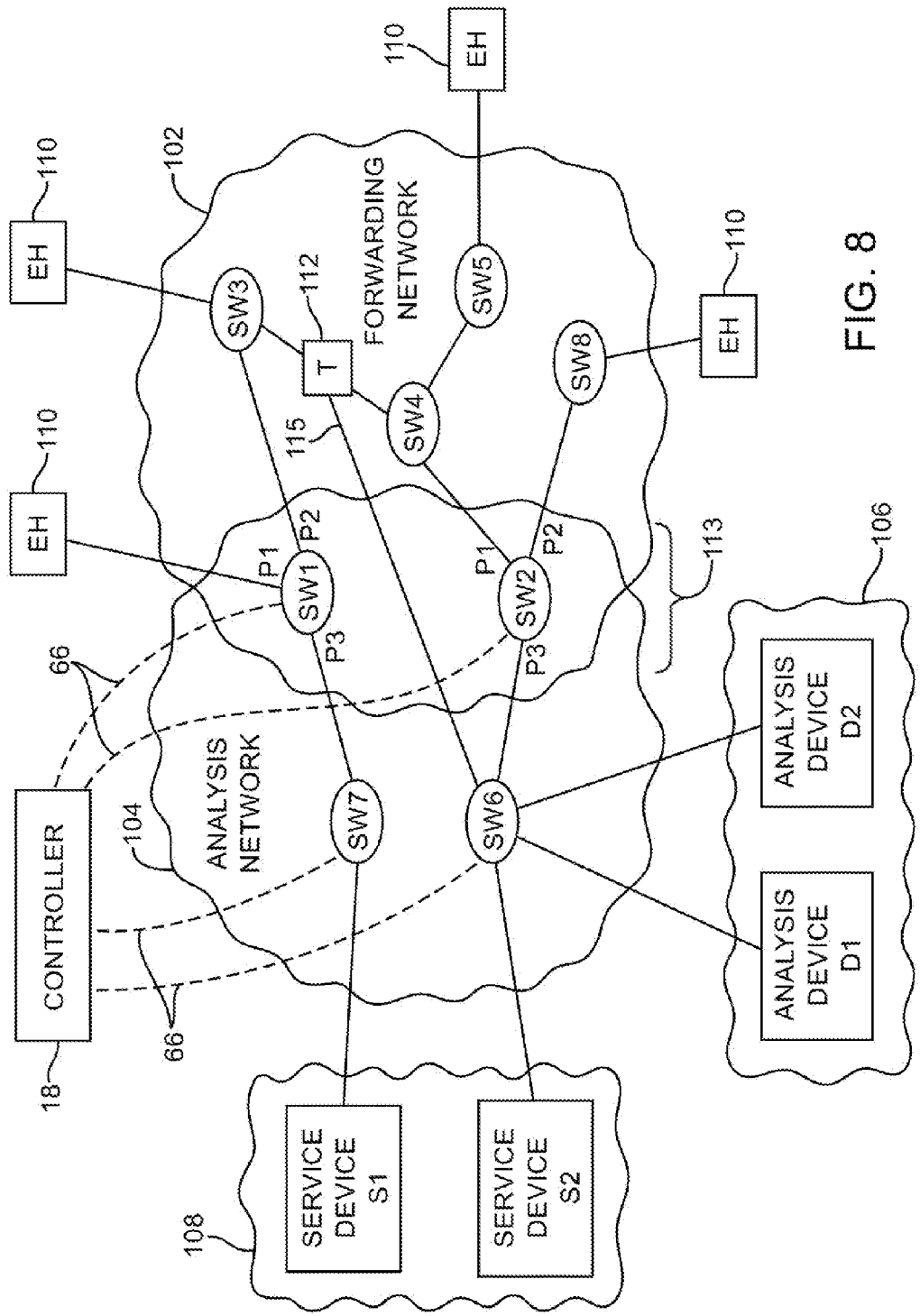
FIG. 8 is a diagram of an illustrative network including an analysis network portion that is controlled by a controller and overlaps with a forwarding network portion in accordance with an embodiment of the present invention.

As networks grow in complexity and size, there is increasing interest and need for network analysis and monitoring. It is generally desirable to perform such network analysis without interrupting normal network operations (e.g., without reducing network performance or affecting normal network traffic forwarding). However, it can be challenging to add network analysis devices to a network while efficiently utilizing network analysis resources. FIG. 8 is a diagram showing how selected switches of a forwarding network 102 may be partially controlled by controller 18 to copy network packets for monitoring without interfering with network forwarding operations performed by forwarding network 102.

As shown in FIG. 8, an analysis network 104 coupled to network 102 may be controlled by controller 18 to help ensure efficient utilization of network analysis resources such as analysis devices 106 and service devices 108. Network 102 may include switches such as switches SW1, SW2, SW3, SW4, SW5 that forward network traffic between end hosts 110. Network 102 may sometimes be referred to herein as a forwarding network or packet forwarding network.

Switches of analysis network 104 may be controlled by controller 18 and may sometimes be referred to as client switches (e.g., switches SW6, SW7, SW1, and SW2 may include controller clients that communicate with controller 18 via control paths 66). Switches that do not communicate with controller 18 via control paths 66 (e.g., because the switches do not include controller clients) may be referred to as non-client switches. For example, switches SW3, SW4, SW5, and SW8 of forwarding network 102 may be referred to as non-client switches. Non-client switches may, if desired, include controller clients that communicate with different controllers (i.e., not controller 18).

Each switch of networks 102 and 104 may include ports (e.g., ports 34 of FIG. 1) to which other network elements such as other switches or end hosts may be coupled to via network links (paths). For example, switch SW1 may include ports P1, P2, and P3 and switch SW2 may include ports P1, P2, and P3. Port P1 of switch SW1 may be coupled to an end host 110, whereas port P2 of switch SW1 may be coupled to non-client switch SW3 and port P3 of switch SW1 may be coupled to client switch SW7 of analysis network 104. Similarly, ports P1, P2, and P3 of switch SW2 may be coupled to switches SW4, SW8, and SW6, respectively.

Analysis devices 106 such as analysis devices D1 and D2 and service devices 108 such as service devices S1 and S2 may be coupled to the client switches of analysis network 104. Analysis devices 106 may include network analysis tools such as network performance monitors, network visibility analysis tools, network capacity analysis tools, network outage analysis tools, or other network analysis tools for analyzing network 102 based on tapped network traffic flows. The network analysis tools may, for example, be implemented on computing equipment that serve as end hosts of analysis network 104 (e.g., analysis device D1 may serve as an end host of analysis network 104 and one or more analysis tools may be implemented on analysis device D1).

Service devices 108 may serve to manipulate network traffic flows prior to analysis by devices 106. Service devices 108 may manipulate network traffic flows by replacing, removing, or otherwise modifying information stored in network packets of the traffic flows. Service devices 108 may, for example, include packet slicing tools, time-stamping tools, or other tools implemented using computing equipment. Multiple tools may be implemented on a service device 108, which serves as an end host of analysis network 104. Controller 18 may route network traffic for monitoring through service devices 108 to manipulate the network traffic before processing by analysis devices 106.

As shown in FIG. 8, analysis network 104 and forwarding network 102 may at least partially overlap. Overlap portion 113 between analysis network 104 and forwarding network 102 may include switches that belong to both forwarding network 102 and analysis network 104. The switches of overlap portion 113 may process and forward network packets between end hosts 110 while at least partially being controlled by controller 18.

As an example, switch SW2 may be a client switch that is fully controlled by controller 18. Controller 18 may provide flow table entries to switch SW2 that control how network packets are forwarded through network 102 (e.g., flow table entries such as shown in FIGS. 6A and 6B). As another example, switch SW1 may be a client switch that is only partially controlled by controller 18. In this scenario, client switch SW1 may forward network packets between end hosts 110 independently from controller 18 while providing separate packet processing functionality such as port mirroring that is controlled by controller 18.

Network monitoring devices such as network tap device 112 may be used to "tap" network traffic flows in network 102 by sending copies of network packets observed by tap devices 112 to analysis network 104. Network tap devices 112 may be interposed between network elements to copy network traffic between the network elements. For example, a network tap device 112 may be interposed between ports of switches SW3 and SW4 to monitor traffic from SW3 to SW4 (or vice versa or both). The network tap devices may copy network traffic without interfering with network traffic flow between network elements. Each network tap device may include a tap port 115 at which copied network traffic is provided. Switches of analysis network 104 may be coupled to tap ports such as tap port 115 and receive the copied network traffic.

Client switches in overlap network portion 113 may be controlled by controller 18 to serve as network tap devices. The client switches may provide network packet copying functionality such as port mirroring functionality that is controlled by controller 18. Port mirroring at the client switches may be implemented by providing flow table entries that direct the client switches to copy network traffic and provide the copied network traffic to a switch port that is coupled to other client switches of analysis network 104.

Figure 9:
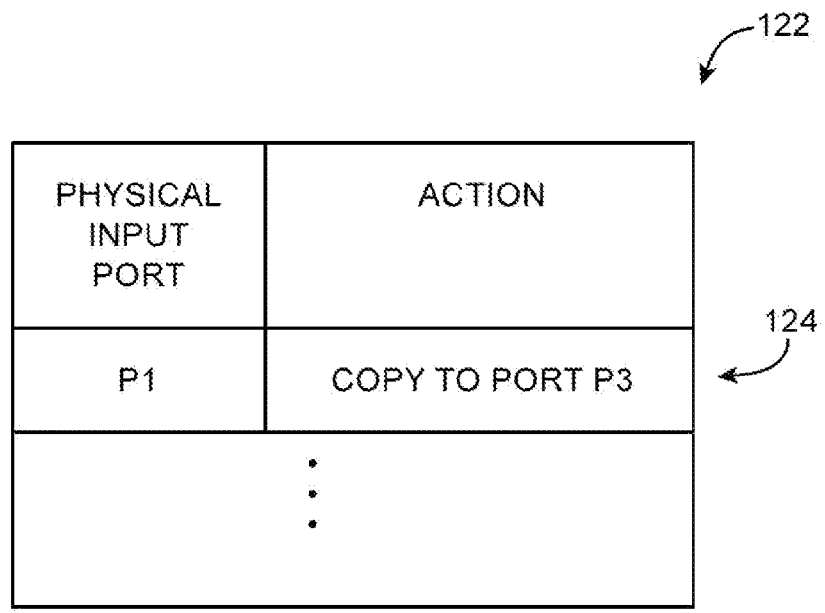
FIG. 9 is a diagram of an illustrative flow table of the type that may be used by a limited hybrid packet processing system in accordance with an embodiment of the present invention.

FIG. 9 is an illustrative diagram of a limited-functionality flow table 122 that may be maintained by switch SW1. As shown in FIG. 9, entries of flow table 122 may identify only a physical input port and a corresponding action. The available actions that may be performed by a switch that maintains flow table 122 may be limited to only a subset of possible actions (e.g., a subset of the actions described in connection with FIG. 6B). For example, the only available action may be a mirroring function in which all network traffic received at the identified physical port is copied to an identified port of the switch that serves as a tap port.

In the example of FIG. 9, flow table entry 124 identifies physical input port P1 of switch SW1 and that all network traffic received at switch port P1 should be copied to port P3 of switch SW1. Flow table entry 124 effectively configures switch SW1 to serve as a tap device interposed between end host 110 that is coupled to port P1 of switch SW1 and switch SW3.

Providing switches with limited-functionality flow tables such as flow table 122 may be desirable in scenarios such as when available switch resources are constrained or when it is desirable to reduce the number of physical tap devices 112. Controller clients with limited-functionality flow tables may be implemented on switches without interfering with packet forwarding operations, which may be especially desirable when coupling an analysis network to an existing forwarding network.

Figure 10:
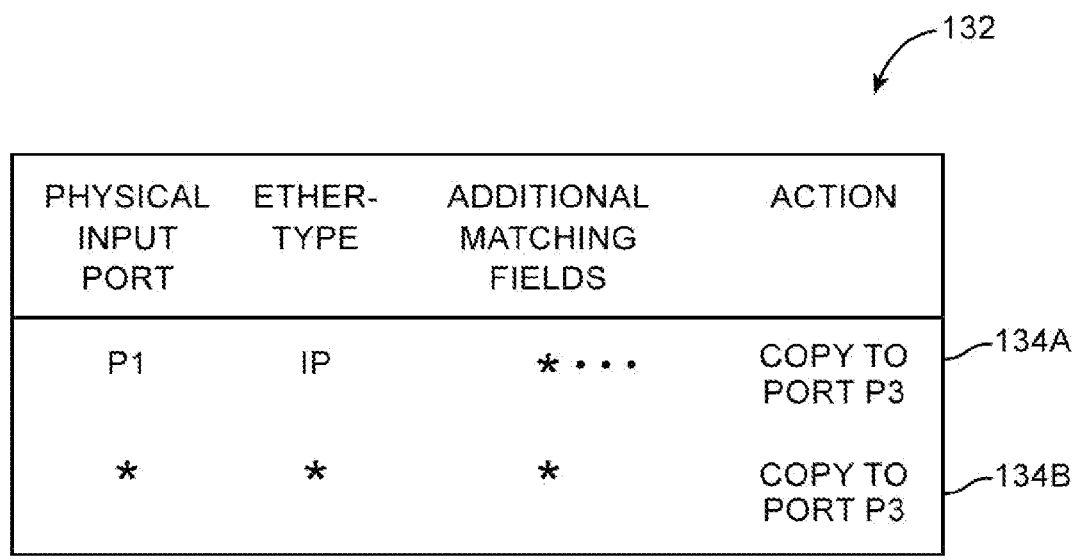
FIG. 10 is a diagram of an illustrative flow table of the type that may be used by a hybrid packet processing system in accordance with an embodiment of the present invention.

The example of FIG. 9 in which flow table 122 is provided with only a physical input port matching field is merely illustrative. If desired, flow tables may be provided with any desired combination of matching fields as shown in FIG. 10. In the example of FIG. 10, flow table 132 may be provided to client switch SW2 of FIG. 8. Each entry 134 (e.g., flow table entries 134A and 134B) of flow table 132 may include a physical input port matching field, an Ethertype matching field, and additional matching fields such as header fields 76 described in connection with FIG. 6A.

Use of additional matching fields such as the Ethertype field provides controller 18 with improved control and flexibility in mirroring network packets. Controller 18 may generate flow table entry 134A so that only network packets received at physical input port P1 of switch SW2 that are associated with the Internet Protocol are copied to port P3 of switch SW2. In other words, only a subset of network traffic received at switch port P1 of switch SW2 that has an Ethertype corresponding to the Internet Protocol may be copied and provided to analysis network 104 via port P3 of switch SW2.

All matching fields of an entry may be wildcarded as shown by entry 134B. If provided with flow table entry 134B, switch SW2 may copy all received network packets to port P3 of switch SW2 (e.g., regardless of which ports the network packets were received at). This example is merely illustrative. If desired, the matching fields of an entry may be provided with any desired combination of wildcarded and non-wildcarded values that match all or a subset of network traffic that is received by the corresponding client switch that maintains the flow table.

Figure 11:
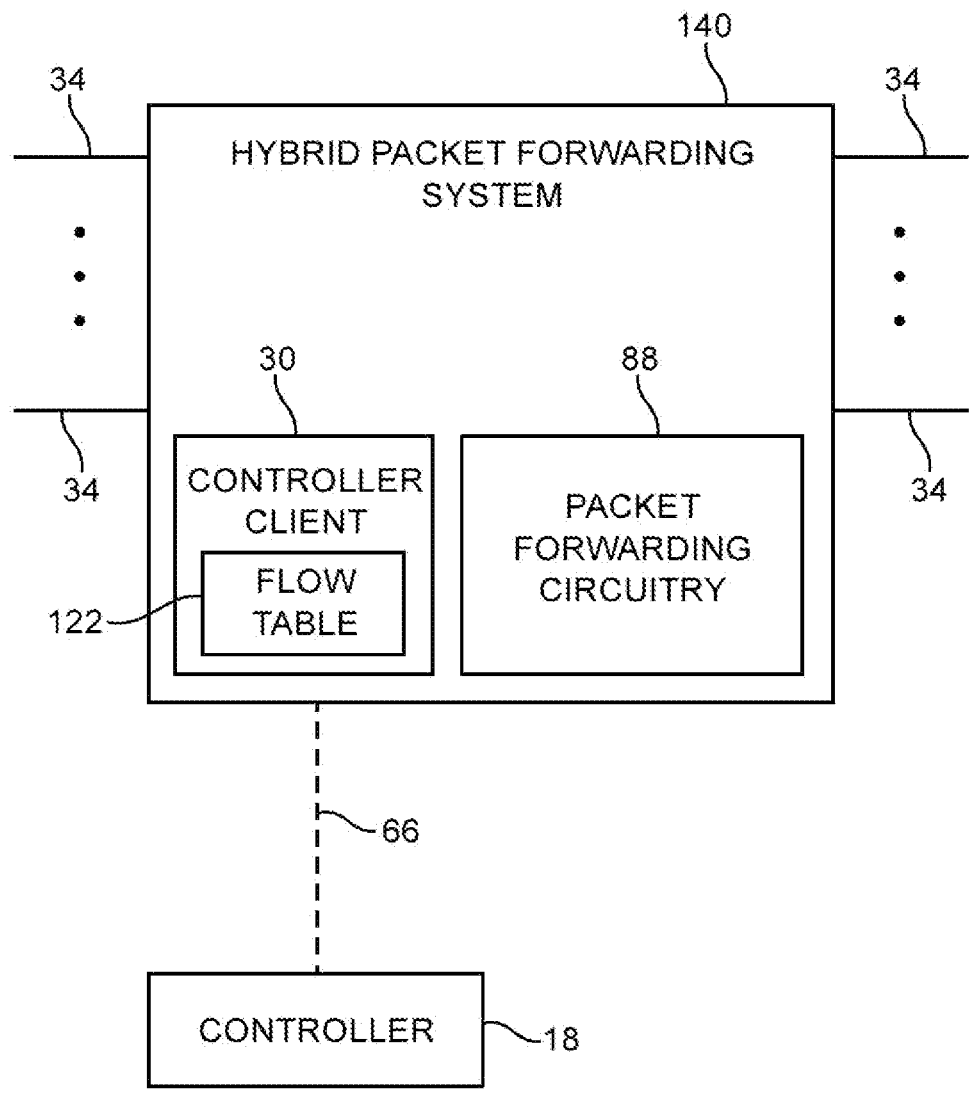
FIG. 11 is a diagram of an illustrative hybrid packet forwarding system in accordance with an embodiment of the present invention.

Packet copying operations may be performed by a switch independently from packet forwarding operations. FIG. 11 is an illustrative diagram of a switch 140 that includes packet forwarding circuitry 88 that is not controlled by controller 18. Packet forwarding circuitry 88 may operate similarly to non-client switches of a forwarding network by forwarding network packets between end hosts 110. Circuitry 88 may perform packet forwarding operations independently of controller 18. Switch 140 may include controller client 30 having limited-functionality flow table 122 (see, e.g., FIG. 10). Switch 140 may therefore be sometimes referred to as a hybrid switch, because switch 140 performs both non-client and client switch functions.

Packet forwarding operations that are performed by circuitry 88 may include communicating with non-client switches of forwarding network 102 to determine how to forward network packets through network 102. For example, circuitry 88 may implement the Spanning Tree Protocol by communicating with the non-client switches to help ensure that no forwarding loops are formed in forwarding network 102.

Controller client 30 may be constrained by the capabilities of flow table 122. Limited flow table 122 may only allow controller client 30 to perform packet copying or other actions (e.g. counting packets that match the flow entry) that do not affect network forwarding paths implemented by packet forwarding circuitry 88. For example, controller 18 may provide flow table entries such as flow table entry 124 of FIG. 9 to hybrid switch 140 via control path 66. The flow table entries may direct controller client 30 to copy some or all network packets received at one or more selected ports and send the copied network packets to a tap port (e.g., to an analysis network via the tap port). As another example, controller 18 may provide flow table entries that direct controller client 30 to update a counter value maintained by the controller client when packets that match the flow table entries are received by the controller client. The counter values may, if desired, by forwarded by the controller client and/or the controller to analysis devices for processing.

The example of FIG. 11 in which hybrid switch 140 is provided with limited flow table 122 is merely illustrative. As another example, hybrid switch 140 may be provided with a limited flow table having multiple matching fields such as flow table 132 of FIG. 10. In general, hybrid switch 140 may be provided with any desired flow table that does not interfere with packet forwarding operations of dedicated packet forwarding circuitry 88.

Figure 12:
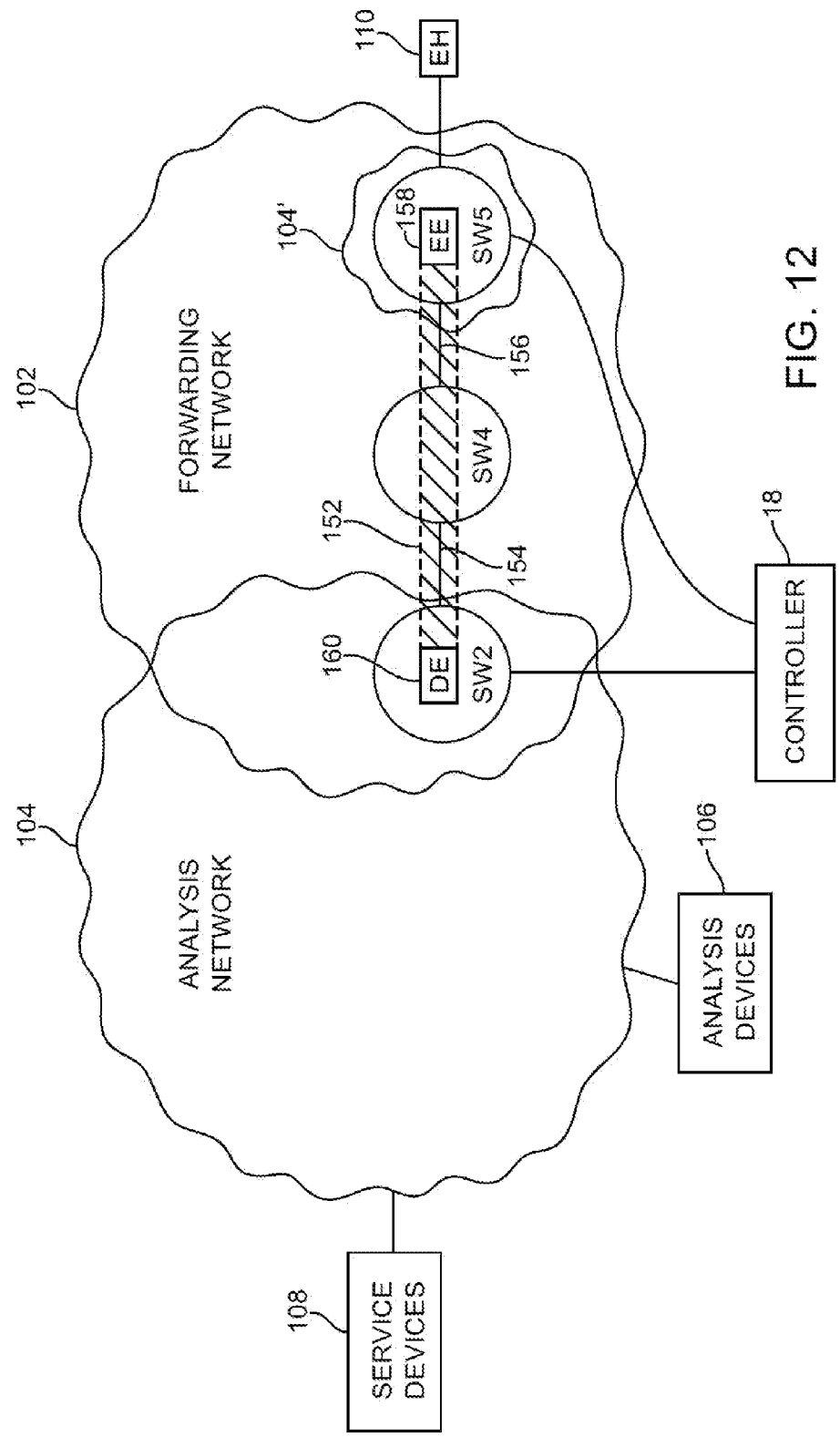
FIG. 12 is a diagram of an illustrative network in which a controller-generated tunneling path is provided between a central analysis network portion and an isolated analysis network portion in accordance with an embodiment of the present invention.

An analysis network may, in some scenarios, include one or more switches that are isolated from service and analysis devices by non-client switches. FIG. 12 is an illustrative diagram of an analysis network having a central portion 104 and an isolated portion 104' that are separated by a portion of forwarding network 102. Service and analysis devices 106 and 108 may be coupled to central analysis network portion 104. It may be desirable to monitor network traffic that is received at switch SW5 or other remote network locations (e.g., locations that are separated from analysis network 104 by at least one non-client switch).

It can be challenging for controller 18 to generate network paths between isolated client switch SW5 and central analysis network portion 104, because non-client switch SW4 is interposed between client switches SW2 and SW5. To implement a forwarding path between client switches SW5 and SW2, controller 18 may generate a tunneling path (network tunnel) between client switches SW5 and SW2. The tunneling path may, for example, be a virtual local area network tunnel. This tunnel may be formed using an encapsulation engine 158 at switch SW5 to encapsulate copied network traffic and using a de-encapsulation engine 160 at switch SW2 to de-encapsulate and thereby recover the copied network traffic. The tunnel may be implemented over network links 154, 156, and traverse non-client switch SW4. Encapsulation engines and de-encapsulation engines in network 10 may use encapsulation methods such as Generic Routing Encapsulation (GRE), Multiprotocol Label Switching (MPLS), Virtual Local Area Network (VLAN) encapsulation techniques, other techniques for encapsulating data for a network tunnel, etc.

The encapsulation and de-encapsulation engines may be controlled and configured by controller 18. In the example of FIG. 12, controller 18 may control encapsulation engine 158 and de-encapsulation engine 160 to form a network tunnel that traverses non-client switch SW4. Controller 18 may control client switch SW5 to copy network packets received from end host 110 (e.g., at a port of client switch SW5) and send the copied packets to client switch SW2 of central analysis network portion 104 using encapsulation engine 158. The copied packets may then be forwarded to analysis tools such as service devices 108 and analysis devices 106 via controller-generated forwarding paths through central analysis network portion 104.

Figure 13:
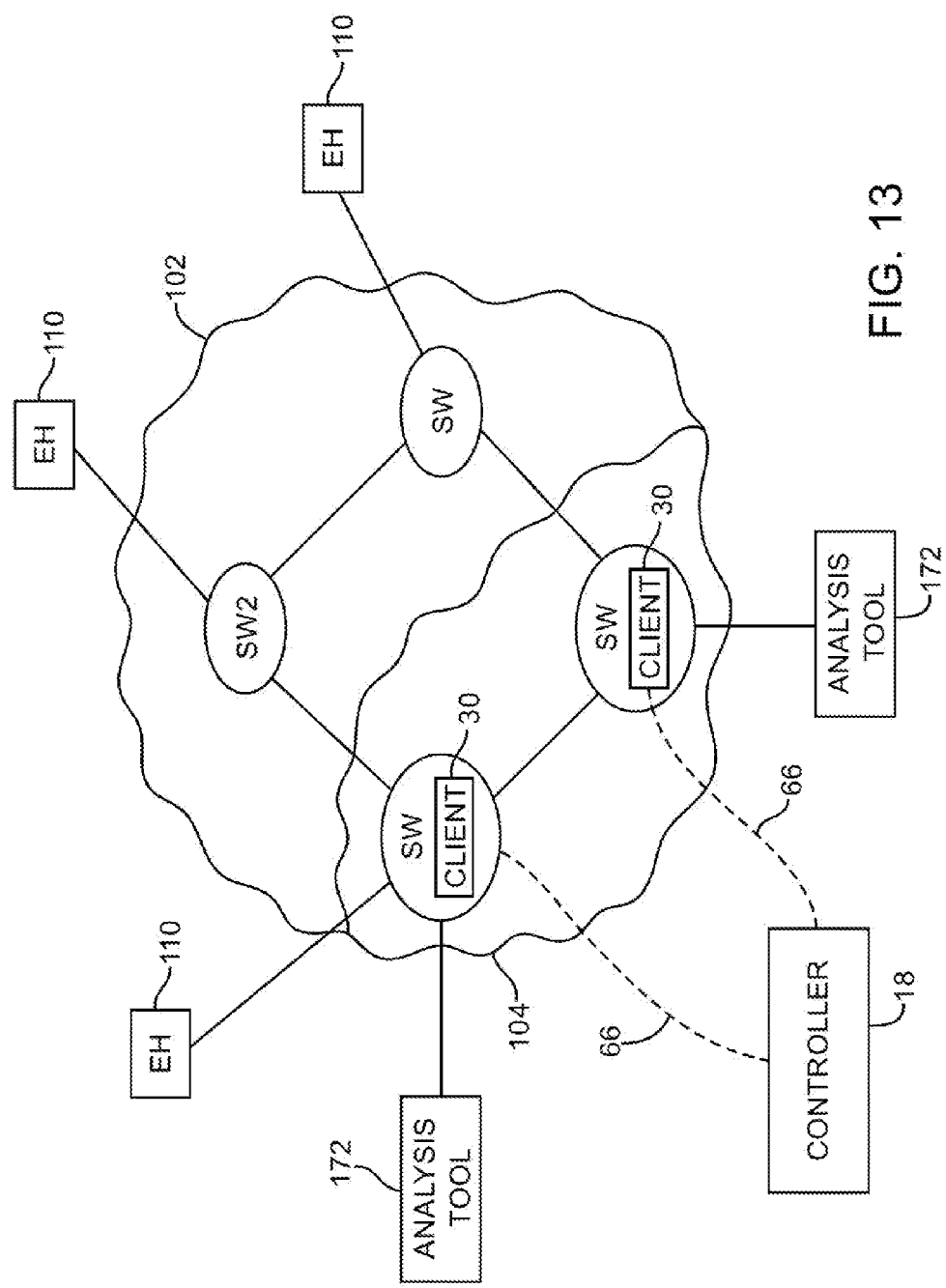
FIG. 13 is a diagram of an illustrative network in which an analysis network portion is formed entirely from switches of a forwarding network in accordance with an embodiment of the present invention.

The example of FIG. 8 and FIG. 12 in which analysis network 104 includes switches that are external to forwarding network 102 is merely illustrative. If desired, analysis network 104 may be entirely implemented using switches of forwarding network 102 that have been provided with controller clients. FIG. 13 is a diagram of an illustrative forwarding network 102 that may include an analysis network 104.

As shown in FIG. 13, switches that are included in analysis network 104 may include controller clients 30 that are controlled by controller 18. Controller 18 may control mirroring and packet forwarding operations of the client switches of FIG. 13. Analysis tools 172 such as service devices 108 and analysis devices 106 (see, e.g., FIG. 8) may be coupled to client switches of analysis network 104. Controller 18 may control the client switches to copy desired network traffic and forward the copied network traffic to the analysis tools. Controller 18 may also control the client switches to forward network packets between end hosts of the forwarding network. For example, controller 18 may provide flow table entries to the client switches that direct the client switches to forward network packets between end hosts 110.

In the example of FIG. 13, analysis network 104 is implemented from a portion of network 102 (e.g., only a subset of the switches of forwarding network 102). However, if desired, each switch of forwarding network 102 may be provided with controller clients 30 that are controlled by controller 18.

Figure 14:
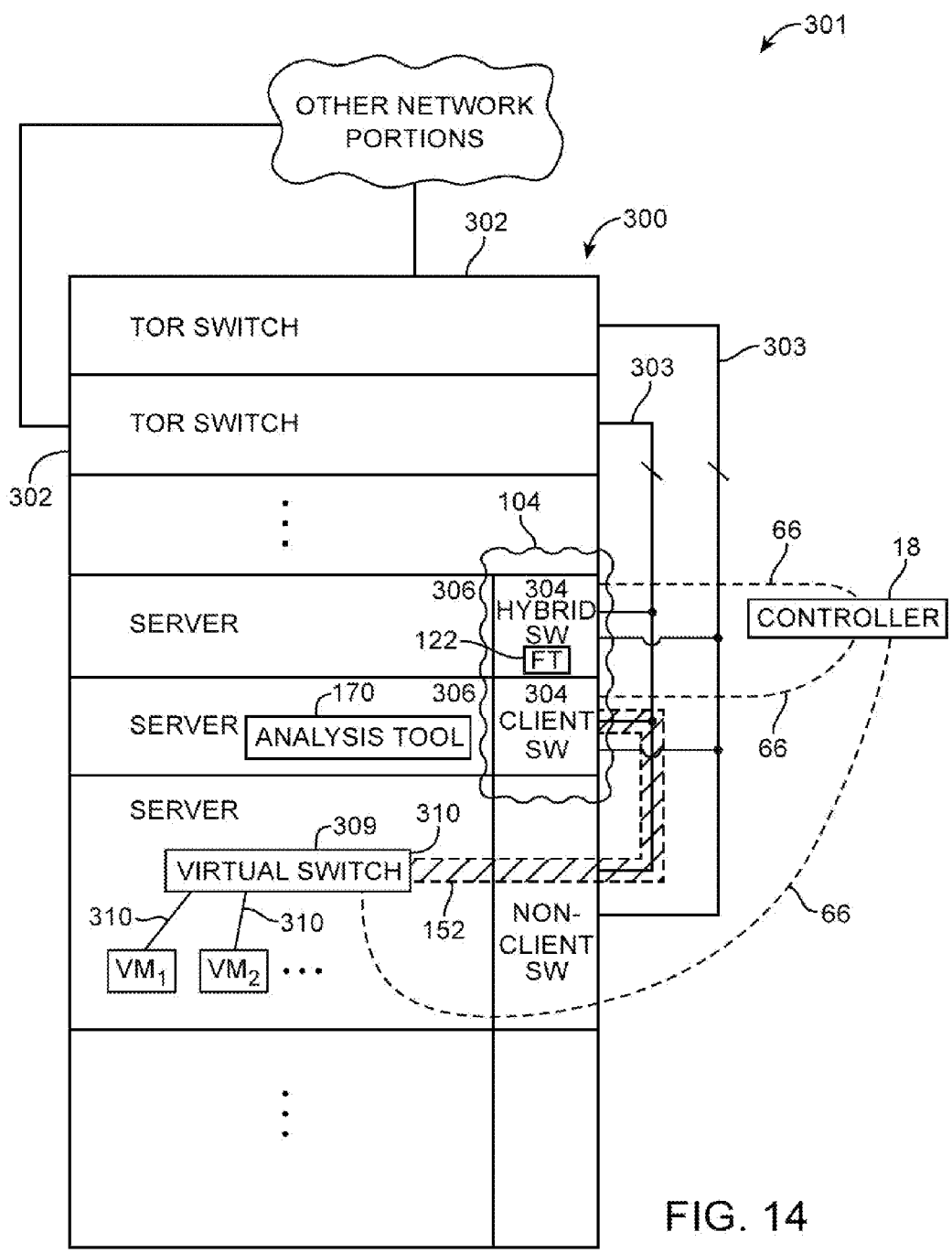
FIG. 14 is a diagram of an illustrative top-of-rack system that may be partially controlled by a controller for network monitoring in accordance with an embodiment of the present invention.

Analysis networks that are controlled by a controller may be implemented using rack-based systems. Rack-based systems may include line cards that are coupled via a back plane (e.g., similar to FIG. 4). FIG. 14 is an illustrative rack-based system 300 that may include analysis network 104. Rack-based system 300 may include multiple servers 306 (or other computing equipment) arranged in a rack structure. Servers 306 may, for example, serve as end hosts in forwarding network 301 and may communicate with other servers or other end hosts in the forwarding network. Each server 306 may be associated with a corresponding switch 304. For example, each server 306 may include multiple portions (e.g., portions of computing equipment) that are coupled to the corresponding switch 304 via switch ports (not shown). Switches 304 may be interconnected via network links 303 that are coupled between ports of the switches. Network links 303 may, for example, form a backplane of rack-based system 300.

Rack-based system 300 may include so-called top-of-rack switches 302 that serve to convey traffic between switches 304 and other portions of network 301. In other words, TOR switches 302 may interface between system 300 and portions of network 301 that are external to system 300. TOR switches 302 may be coupled to switches 304 via network links 303.

As an example, network 301 may include multiple rack-based systems that are connected via TOR switches 302. As another example, other networks or other portions of the network may be connected to servers 306 and switches 304 via TOR switches 302. In general, there are somewhat fewer TOR switches 302 in rack-based system 300 than switches 304. For example, in a typical rack-based system 300, a few (e.g., two, three, four, etc.) TOR switches may serve as centralized forwarding nodes for tens of switches 304 and servers 306 (e.g., twenty, thirty, forty, fifty, or more switches 304).

Analysis tools 170 may be implemented using one or more servers 306 that are coupled to analysis network 104. Each switch 304 of analysis network 104 may be a client switch that is at least partially controlled by controller 18 via control paths 66. Client switches of analysis network 104 may include controller clients with packet forwarding capabilities or may be hybrid switches having somewhat limited controller client functionality. The hybrid switches may include dedicated packet forwarding circuitry that forwards network packets between end hosts of forwarding network 301 (see, e.g., packet forwarding circuitry 88 of FIG. 11).

Controller 18 may control the client switches to copy network packets without interfering with packet forwarding operations between end hosts of FIG. 14. For example, server 306 that is coupled to the hybrid switch of network 301 may send network packets to other portions of the network via the hybrid switch. In this scenario, controller 18 may control the hybrid switch (e.g., by providing flow table entries for flow table 122) to copy the network packets. Controller 18 may control the client switches to send the copied network packets to analysis tool 170 without interfering with forwarding of the original network packets.

Servers 306 may be used to implement virtual switches such as hypervisor switches. A virtual switch may be implemented using computing resources of a server 306 and may be coupled to other switches and virtual end hosts via virtual ports 310. For example, virtual switch 309 may include virtual ports 310 coupled to virtual machines (end hosts) VM1, and VM2 that are implemented using computing resources of server 306. Virtual switch 309 may be separated from analysis tool 170 by the non-client switch that corresponds to the server used to implement virtual switch 309. In order to monitor network traffic received at virtual switch 309 (e.g., from end hosts VM1 and VM2), controller 18 may establish a tunnel 152 between a client switch of analysis network 104 and virtual switch 309 that traverses the non-client switch. Tunnel 152 may be implemented similarly to the network tunnel formed between switches SW2 and SW5 of FIG. 12.

Figure 15:
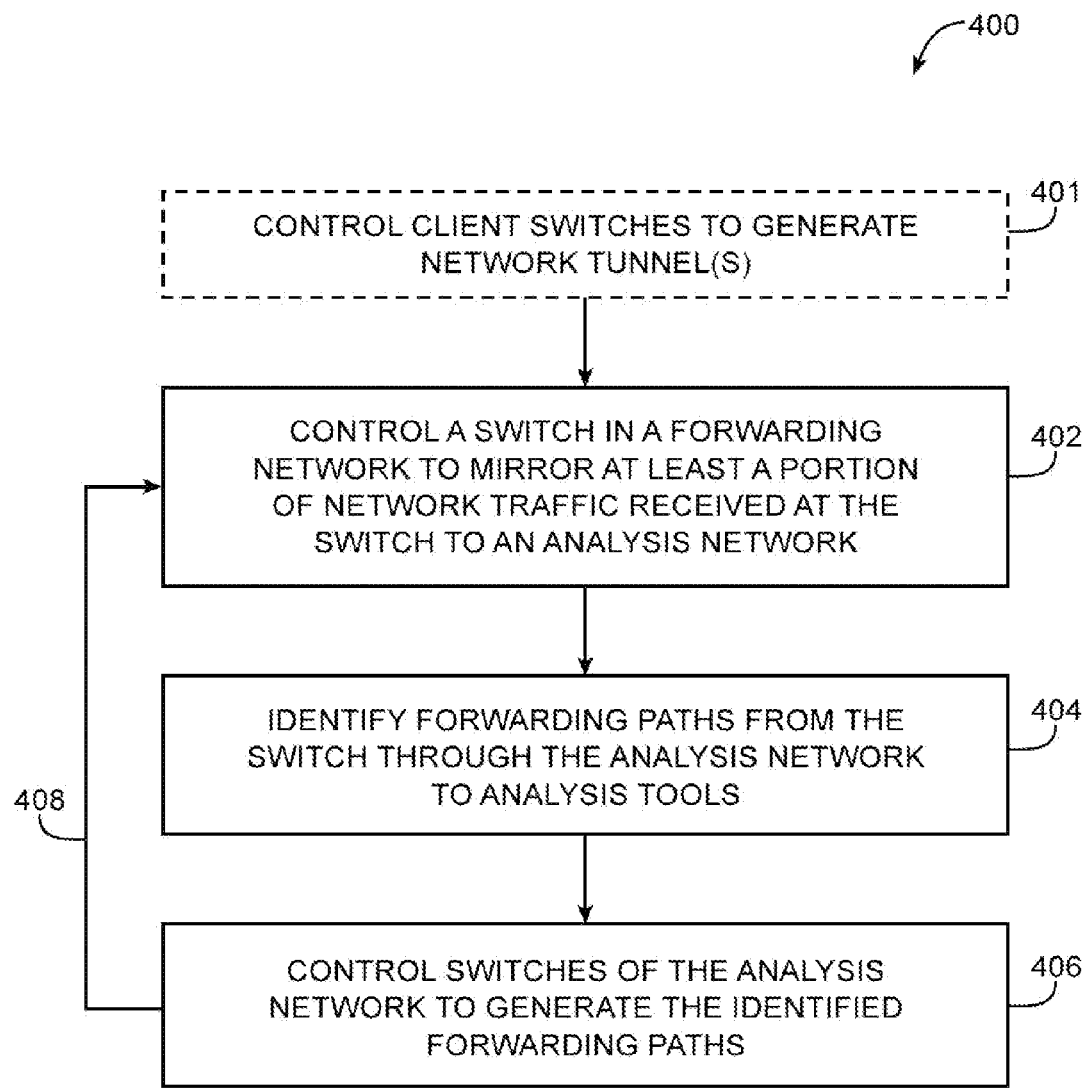
FIG. 15 is a flow table of illustrative steps that may be performed by a controller to control switches of a forwarding network to copy network packets and send the copied network packets to analysis tools in accordance with an embodiment of the present invention.

FIG. 15 is a flow chart 400 of illustrative steps that may be performed by a controller to control an analysis network that includes at least one switch that belongs to a forwarding network (e.g., client switches in an overlapping network portion of the analysis and forwarding networks such as overlap portion 113 of FIG. 8).

During optional step 401, controller 18 may control client switches to generate network tunnels that connect isolated portions of the analysis network to a central portion of the analysis network (e.g., a central portion to which analysis tools are coupled). For example, network tunnels 152 of FIGS. 12 and 14 may be generated.

During step 402, controller 18 may control a client switch in the forwarding network to mirror at least a portion of network traffic received at the client switch to the analysis network. The controller may configure the client switch for mirroring functions without interfering with packet forwarding operations through the forwarding network. The portion of network traffic may be selected based on header fields so as to only copy a desired subset of network traffic that is forwarded through the client switch between end hosts of the forwarding network. As an example, controller 18 may provide flow table entries to the client switch such as flow table entries 122 and 132 of FIGS. 9 and 10.

During step 404, controller 18 may identify forwarding paths from the client switch through the analysis network to desired analysis tools such as service devices, analysis devices, etc. The forwarding paths may be determined based on network topology information maintained by the controller. The network topology information may include information identifying links between client switches and between client switches and end hosts. Controller 18 may maintain the network topology information based on information retrieved from the switches via control paths.

During step 406, controller 18 may control the switches of the analysis network to generate the identified forwarding paths. For example, flow table entries that control packet forwarding operations such as shown in FIGS. 6A and 6B may be provided to the client switches of the analysis network to forward copied network packets through the identified forwarding paths.

The foregoing is merely illustrative of the principles of this invention and various modifications can be made by those skilled in the art without departing from the scope and spirit of the invention.

What is claimed is:

1. A method of using a controller that controls client switches in an analysis network that is coupled to a forwarding network, wherein the forwarding network performs packet forwarding operations to forward network packets between end hosts that are coupled to the forwarding network, the method comprising:
   selecting a client switch of the analysis network; and
   controlling the selected client switch of the analysis network to copy at least a portion of the network packets that are forwarded between the end hosts of the forwarding network without interfering with the packet forwarding operations of the forwarding network.

2. The method defined in claim 1 wherein selecting the client switch of the analysis network comprises:
   selecting a client switch that is included in the forwarding network and forwards the network packets between the end hosts of the forwarding network.

3. The method defined in claim 1 wherein analysis devices are coupled to the analysis network, the method further comprising:

controlling the client switches to forward the copied network packets to the analysis devices.

4. The method defined in claim 3 further comprising:
identifying forwarding paths from the selected client switch to the analysis devices; and
controlling the client switches to generate the identified forwarding paths.

5. The method defined in claim 4 wherein controlling the client switches to generate the identified forwarding paths comprises:
providing flow table entries to the client switches that direct the client switches to forward the copied network packets along the identified forwarding paths.

6. The method defined in claim 2 wherein the analysis network includes a central portion and an isolated portion that is separated from the central portion by at least one non-client switch of the forwarding network, wherein the isolated portion includes the selected client switch, the method further comprising:
controlling the client switches to generate a tunneling path between the selected client switch and the central portion of the analysis network through the non-client switch.

7. The method defined in claim 2 wherein the selected client switch comprises a hybrid client switch that includes packet processing circuitry that forwards the network packets through the hybrid client switch independently from the controller and wherein controlling the selected client switch comprises:
providing a flow table entry that includes matching fields and directs the hybrid client switch to copy only the network packets that are forwarded by the packet processing circuitry and that match the matching rules.

8. The method defined in claim 7 wherein the network packets include header fields and wherein providing the flow table entry comprises:
generating the flow table entry to match at least one header field of the network packets that are forwarded by the packet processing circuitry.

9. The method defined in claim 7 wherein generating the flow table entry comprises:
generating the flow table entry to include only a physical input port matching field.

10. The method defined in claim 2 wherein the selected client switch comprises a hybrid client switch that includes packet processing circuitry that forwards the network packets through the hybrid client switch independently from the controller and wherein controlling the selected client switch comprises:
providing a flow table entry that includes matching fields and directs the hybrid client switch to count only the network packets that are forwarded by the packet processing circuitry and that match the matching rules.

11. A network system, comprising:
a packet forwarding network portion that performs packet forwarding operations to forward network packets between end hosts that are coupled to the packet forwarding network portion;
an analysis network portion that is coupled to analysis devices, wherein the analysis network portion includes at least one switch that is also included in the packet forwarding network portion; and
a controller that controls the analysis network portion to copy at least a portion of the network packets that are forwarded between the end hosts of the packet forwarding network portion without interfering with the network forwarding operations of the packet forwarding network portion.

12. The network defined in claim 11 wherein the at least one switch that is included in the analysis network portion and the packet forwarding network portion comprises a hybrid switch having packet processing circuitry that forwards the network packets through the hybrid switch independently from the controller.

13. The network defined in claim 12 wherein the hybrid switch includes a controller client having a flow table and wherein the controller provides at least one flow table entry for the flow table.

14. The network defined in claim 13 wherein the flow table entry provided by the controller includes at least one matching field and directs the hybrid switch to copy only the network packets forwarded by the packet processing circuitry that match the at least one matching field.

15. The network defined in claim 14 wherein the hybrid switch includes a plurality of ports at which the network packets are received and through which the network packets are forwarded and wherein the at least one matching field comprises an input port matching field that identifies a selected port from the plurality of ports.

16. The network defined in claim 15 wherein the flow table entry directs the hybrid switch to forward the copied network packets to a selected port of the plurality of ports that is coupled to an additional client switch of the analysis network and wherein the controller is configured to control the additional client switch of the analysis network to forward the copied network packets to the analysis devices.

17. The network defined in claim 11 wherein the at least one switch that is included in the analysis network portion and the packet forwarding network portion comprises a client switch that is at least partially controlled by the controller, wherein the analysis network portion includes a central analysis network portion to which the analysis devices are coupled, wherein the client switch and the central analysis network portion are separated by at least one non-client switch of the forwarding network portion that is not controlled by the controller, and wherein the controller controls the client switch to generate a tunneling path between the client switch and the central analysis network portion.

18. The network defined in claim 11 wherein the controller controls the analysis network to count how many packets are forwarded by the switch of the analysis network that is also included in the packet forwarding network portion.

19. A network system, comprising:
a plurality of servers;
a plurality of switches each coupled to a respective server of the plurality of servers, wherein the plurality of switches performs network forwarding operations to forward network packets received from the plurality of servers and wherein the plurality of switches includes a client switch having a controller client; and
a controller that is coupled to the client switch via control paths, wherein the controller controls the client switch to copy at least a portion of network packets received at the client switch.

20. The network system defined in claim 19 wherein the network system comprises a rack-based system and wherein the rack-based system further comprises a top-of-rack switch that interfaces between the plurality of switches of the rack-based system and external network portions.

21. The rack-based system defined in claim 20 wherein the client switch comprises a first client switch, wherein at least one server of the plurality of servers is configured as an analysis tool, wherein a switch that is coupled to the analysis tool comprises a second client switch, wherein the controller is configured to control the first and second client switches to forward the copied network packets to the analysis tool without interfering with the network forwarding operations.

22. The rack-based system defined in claim 21 wherein a virtual switch is implemented on a given server of the plurality of servers, the rack-based system further comprising:
   a controller-generated tunneling path between the virtual switch and the switch that is coupled to the analysis tool.

* * * * *